(12) United States Patent
Lu et al.

(10) Patent No.: US 11,520,022 B2
(45) Date of Patent: Dec. 6, 2022

(54) SCANNING FLASH LIDAR WITH LIQUID CRYSTAL ON SILICON LIGHT MODULATOR

(71) Applicant: BEIJING VOYAGER TECHNOLOGY CO., LTD., Beijing (CN)

(72) Inventors: Yue Lu, Mountain View, CA (US); Youmin Wang, Berkeley, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 112 days.

(21) Appl. No.: 17/136,926

(22) Filed: Dec. 29, 2020

(65) Prior Publication Data

US 2022/0206125 A1 Jun. 30, 2022

(51) Int. Cl.
*G02F 1/13* (2006.01)
*G01S 7/4863* (2020.01)
*H04N 9/31* (2006.01)
*G02F 1/1335* (2006.01)
*G01S 17/931* (2020.01)

(52) U.S. Cl.
CPC .......... *G01S 7/4863* (2013.01); *G02F 1/1326* (2013.01); *G02F 1/133528* (2013.01); *H04N 9/3152* (2013.01); *G01S 17/931* (2020.01)

(58) Field of Classification Search
CPC .... G01S 7/4863; G01S 17/931; G02F 1/1326; G02F 1/133528; H04N 9/3152
See application file for complete search history.

(56) References Cited

U.S. PATENT DOCUMENTS

2003/0058408 A1* 3/2003 Magarill .............. G02B 5/3083
353/20
2020/0256960 A1* 8/2020 LaChapelle ........... G01S 7/4817

* cited by examiner

*Primary Examiner* — James A Dudek
(74) *Attorney, Agent, or Firm* — Bayes PLLC (57) ABSTRACT

Embodiments of the disclosure provide a liquid crystal on silicon (LCOS) light modulator, an optical sensing system, and an optical sensing method. The optical sensing system includes a transmitter configured to emit an optical signal toward an environment surrounding the optical sensing system, and a receiver configured to receive the optical signal returning from the environment. The receiver further includes the LCOS light modulator and a receiving lens. The LCOS light modulator is configured to spatially modulate a polarization of the optical signal in order to allow only a spatially-selected portion of the optical signal to pass through the LCOS light modulator at one time. The receiving lens is configured to focus the spatially-selected portion of the optical signal received from the LCOS light modulator on a photodetector of the receiver.

20 Claims, 6 Drawing Sheets

SCANNING FLASH LIDAR WITH LIQUID CRYSTAL ON SILICON LIGHT MODULATOR

TECHNICAL FIELD

The present disclosure relates to a light detection and ranging (LiDAR) system, and more particularly to, a liquid crystal on silicon (LCOS) light modulator for receiving optical signal in the LiDAR system.

BACKGROUND

Scanning flash LiDAR is developed for more accurate and efficient LiDAR imaging. However, in a scanning flash LiDAR system, due to the limited transmitter aperture size, typically the outgoing laser divergence is larger than the point cloud resolution of the system. For example, the beam propagation product of the laser aperture size and the laser divergence angle is a constant. Using a 905 nm pulsed laser diode as an example, the emitter junction channel length is 220 um and the divergence angle is typically 20°.

One attempt to reduce the beam divergence is to increase the aperture size by increasing the size of the scanning mirror. However, currently feasible mirror sizes still cannot afford the desired beam divergence. For example, the typical resolution spot size for a high-resolution LiDAR system is required to be <0.05°. But when collimated by a 10 mm diameter MEMS mirror (which is already quite large), a laser beam would have an outgoing beam divergence of 0.44°, still much larger than the desired spot size. Therefore, it is difficult to further control the divergence angle to the same size level of the resolution spot.

Embodiments of the disclosure address the above problems by including a LCOS light modulator in the receiver of a scanning flash LiDAR system.

SUMMARY

Embodiments of the disclosure provide an exemplary optical sensing system. The optical sensing system includes a transmitter configured to emit an optical signal toward an environment surrounding the optical sensing system, and a receiver configured to receive the optical signal returning from the environment. The receiver further includes a LCOS light modulator and a receiving lens. The LCOS light modulator is configured to spatially modulate a polarization of the optical signal in order to allow only a spatially-selected portion of the optical signal to pass through the LCOS light modulator at one time. The receiving lens is configured to focus the spatially-selected portion of the optical signal received from the LCOS light modulator on a photodetector of the receiver.

Embodiments of the disclosure also provide an exemplary optical sensing method using a LCOS light modulator. The exemplary optical sensing method includes receiving an optical signal returning from an environment. The optical sensing method further includes spatially modulating a polarization of the optical signal, by the LCOS light modulator, in order to allow only a spatially-selected portion of the optical signal to pass through the LCOS light modulator at one time. The optical sensing method also includes focusing, by a receiving lens, the spatially-selected portion of the optical signal received from the LCOS light modulator on a photodetector.

Embodiments of the disclosure further provide an exemplary LCOS light modulator for spatially modulating an optical signal. The exemplary LCOS light modulator includes a plurality of LCOS elements arranged in an array and each individually addressable through an electrode. At least one LCOS element spatially corresponding to a spatially-selected portion of the optical signal is configured to be turned on at one time to spatially modulate a polarization of the optical signal in order to allow only the spatially-selected portion of the optical signal to pass through the LCOS light modulator at one time. The at least one LCOS element is configured to be turned on by a control signal supplied to the corresponding electrode.

It is to be understood that both the foregoing general description and the following detailed description are exemplary and explanatory only and are not restrictive of the present disclosure, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide a LCOS light modulator for spatially modulating an optical signal in a receiver of a LiDAR system. According to one example, the LCOS light modulator may be disposed between a condenser lens and a receiving lens of the receiver. In some embodiments, the LCOS light modulator may include a plurality of LCOS elements arranged in an array and each individually addressable through an electrode. In some embodiments, each LCOS element may spatially correspond to a spatially-selected portion of the optical signal. When at least one LCOS element is turned on, the LCOS light modulator may spatially modulate a polarization of the optical signal in order to allow only the spatially-selected portion of the optical signal to pass through the LCOS light modulator at one time and received by a receiving lens of the receiver. In some embodiments, to allow the optical signal to be completely detected, the LCOS elements collectively corresponding to the field-of-view (FOV) of the receiver may sequentially be turned on and off such as one-by-one, two-by-two, or the like, thereby allowing all of the received optical signal to be sequentially received by a receiving lens and then focused on a photodetector.

In some embodiments, the LCOS light modulator may include a polarization beam splitter. The polarization beam splitter may split an incident optical signal into two orthogonal, linearly-polarized optical signals of different polarizations. The optical signal of a first polarization may be directed towards the plurality of LCOS elements by the polarization beam splitter. At least one LCOS element is turned on at one time and configured to change the corresponding spatially-selected portion of the optical signal from the first polarization to a second polarization. The optical signal may be reflected to the beam splitter. The beam splitter may further be configured to direct the spatially-selected portion of the optical signal of the second polarization to a receiving lens, and dispose the remaining portion of the optical signal.

In some embodiments, each LCOS element may include a twisted nematic liquid crystal (TN LC) layer that can be turned on or off through the corresponding electrode. In some embodiments, when the TN LC layer is turned on, the TN LC layer is configured to change a linearly-polarized optical signal of a first polarization to a circularly-polarized optical signal. In some embodiments, each LCOS element may further include a reflector configured to back-reflect the circularly-polarized optical signal. When the TN LC layer is turned on, the TN LC layer is further configured to change the circularly-polarized optical signal back-reflected by the reflector to a linearly-polarized optical signal of a second polarization.

By controlling the optical signal to be received portion-by-portion sequentially, instead of all the optical signal being received simultaneously like other existing flash LiDAR systems, the optical signal detected by the photodetector of the disclosed LiDAR system at any given time may be in a much smaller spot size. That is, even the outgoing beam divergence of a laser beam is large (e.g., 0.44°), by dividing the received optical signal into multiple portions (e.g., ten portions, twenty portions, forty portions, etc.) and allowing only one portion (or even two or three separate portions if there are, for example, twenty, or forty LCOS elements) to pass through the LCOS light modulator to reach the photodetector, the resolution spot size for a high-resolution LiDAR system may still be achieved (e.g., the detected spot size for every single portion may correspond to an outgoing beam divergence of 0.044°, 0.022°, 0.011°, etc.). That is, the disclosed LCOS light modulator may advantageously allow a sub-resolution signal to be detected without further increasing the size of the MEMS mirror in a transmitter of a LiDAR system. Other advantages of the disclosed LCOS light modulator include its easy integration into the existing flash LiDAR systems, without changing much of the other components included in these LiDAR systems.

The features and advantages described herein are not all-inclusive and many additional features and advantages will be apparent to one of ordinary skill in the art in view of the figures and the following descriptions.

The disclosed LiDAR system containing a LCOS light modulator can be used in many applications. For example, the disclosed LiDAR system can be used in advanced navigation technologies, such as to aid autonomous driving or to generate high-definition maps, in which the optical sensing system can be equipped on a vehicle.

Figure 1:
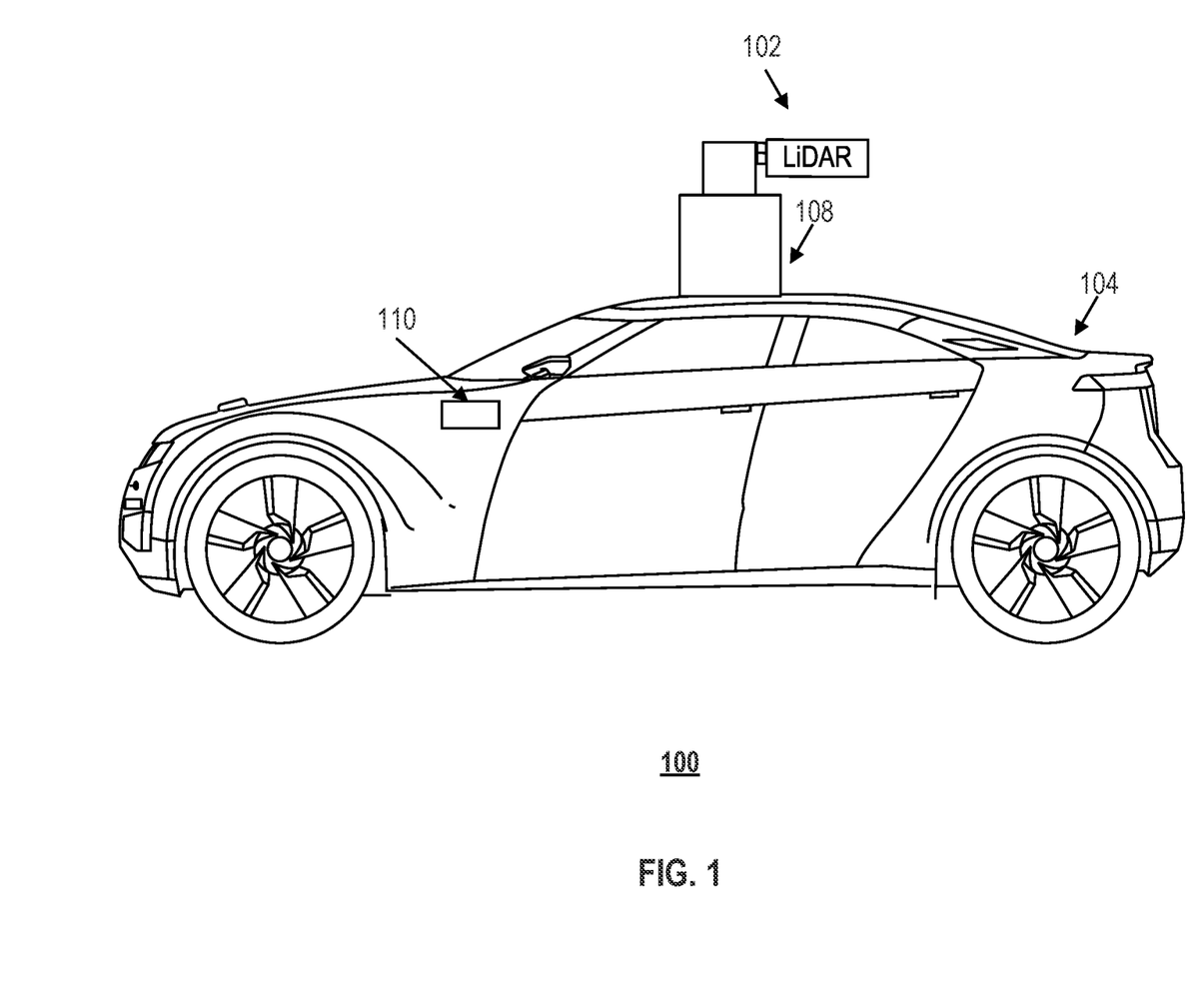
FIG. 1 illustrates a schematic diagram of an exemplary vehicle equipped with a LiDAR system containing a LCOS light modulator, according to embodiments of the disclosure.

FIG. 1 illustrates a schematic diagram of an exemplary vehicle equipped with an optical sensing system containing a LCOS light modulator, according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with an optical sensing system, e.g., a LiDAR system 102 (also referred to as "LiDAR system 102" hereinafter) mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with laser beams and measuring the reflected/scattered pulses with a receiver containing the LCOS light modulator. The laser beams used for LiDAR system 102 may be ultraviolet, visible, or near-infrared, and may be pulsed or continuous wave laser beams. In some embodiments of the present disclosure, LiDAR system 102 may capture point clouds including depth information of the objects in the surrounding environment, which may be used for constructing a high-definition map or 3-D buildings and city modeling. As vehicle 100 moves along the trajectory, LiDAR system 102 may continuously capture data including the depth information of the surrounding objects (such as moving vehicles, buildings, road signs, pedestrians, etc.) for map, building, or city modeling construction.

Figure 2:
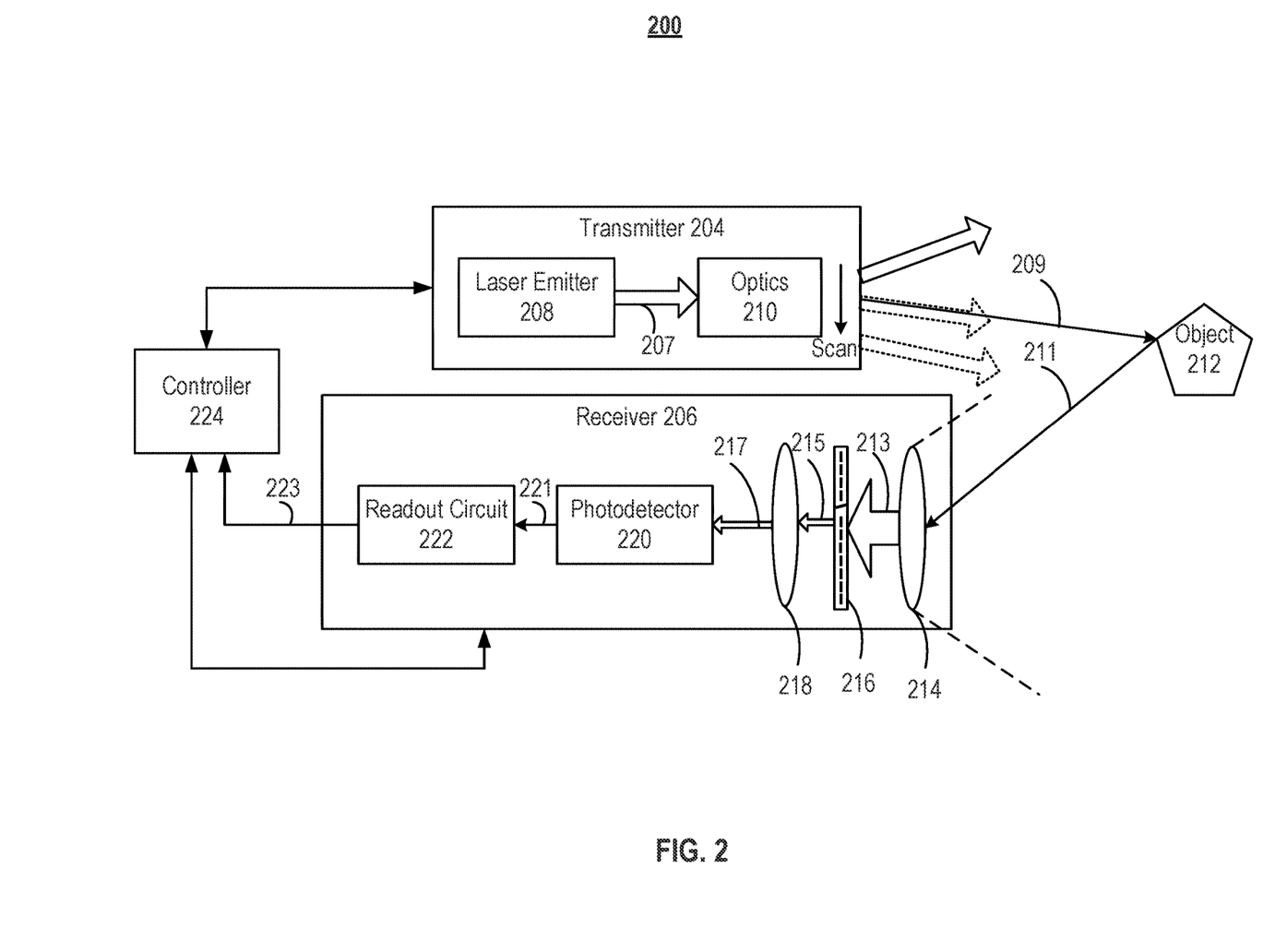
FIG. 2 illustrates a block diagram of an exemplary LiDAR system containing a LCOS light modulator, according to embodiments of the disclosure.

FIG. 2 illustrates a block diagram of an exemplary LiDAR system containing a LCOS light modulator, according to embodiments of the disclosure. In some embodiments, LiDAR system 102 may be a scanning flash LiDAR. As illustrated, LiDAR system 102 may include a transmitter 204, a receiver 206, and a controller 224 coupled to transmitter 204 and receiver 206. Transmitter 204 may further include a laser emitter 208 for emitting an optical signal and optics 210 for shaping an emitted optical signal. Receiver 206 may further include a condenser lens 214, a LCOS light modulator 216, a receiving lens 218, a photodetector 220, and a readout circuit 222.

Transmitter 204 may emit optical beams (e.g., pulsed laser beams, continuous wave (CW) beams, frequency modulated continuous wave (FMCW) beams) along multiple directions. Transmitter 204 may include one or more laser sources (e.g., a laser emitter 208) and one or more optics 210. According to one example, transmitter 204 may sequentially emit a stream of laser beams in different directions within a scan filed-of-view (FOV) (e.g., a range in angular degrees), as illustrated in FIG. 2.

Laser emitter 208 may be configured to provide laser beams 207 (also referred to as "native laser beams") to optics 210. For instance, laser emitter 208 may generate laser beams in the ultraviolet, visible, or near-infrared wavelength range, and provide the generated laser beams to optics 210. In some embodiments of the present disclosure, laser emitter 208 may include a pulsed laser diode (PLD), a CW laser diode, a vertical-cavity surface-emitting laser (VCSEL), a fiber laser, etc. A pulsed or CW laser diode may be a semiconductor device similar to a light-emitting diode (LED) in which the laser beam is created at the diode's junction. Depending on the semiconductor materials of diodes in laser emitter 208, the wavelength of incident laser beams 207 may be at different values, such as 760 nm, 785 nm, 808 nm, 848 nm, 905 nm, 940 nm, 980 nm, 1064 nm, 1083 nm, 1310 nm, 1370 nm, 1550 nm, 1625 nm, 1650 nm, 1940 nm, 2000 nm, etc. It is understood that any suitable laser emitter may be used as laser emitter 208 for emitting laser beams 207 at a proper wavelength.

Optics 210 may include optical components (e.g., lenses, mirrors) that can shape the laser light and collimate the laser light into a narrow laser beam to increase the scan resolution and the range to scan an object 212. In some embodiments, transmitter 204 may also include a scanner (not shown) configured to emit laser beams 209 to object 212 in a range of detection angles (collectively forming the FOV of transmitter 204). In some embodiments, object 212 may be made of a wide range of materials including, for example, non-metallic objects, rocks, rain, chemical compounds, aerosols, clouds and even single molecules. In some embodiments, at each time point during the scan, a scanner may emit laser beams 209 to object 212 in a direction within a range of scanning angles by rotating a deflector, such as a micromachined mirror assembly.

Receiver 206 may be configured to detect returned laser beams 211 returned from object 212. Upon contact, laser light can be reflected/scattered by object 212 via backscattering, such as Rayleigh scattering, Mie scattering, Raman scattering, and fluorescence. Returned laser beams 211 may be in a same or different direction from laser beams 209. In some embodiments, receiver 206 may collect laser beams returned from object 212 and output signals reflecting the intensity of the returned laser beams.

As illustrated in FIG. 2, receiver 206 may include condenser lens 214, LCOS light modulator 216, receiving lens 218, photodetector 220, and readout circuit 222. Condenser lens 214 may collect laser beam 211 returning from the environment in the receiver FOV (e.g., from object 212 as illustrated in FIG. 2). Condenser lens 214 may further collimate the received optical signal to a narrow laser beam 213 to increase the detection resolution. Condenser lens 214 may then pass the collimated optical signal to LCOS light modulator 216. For example, to improve detection resolution, condenser lens 214 may collimate the collected laser beam 211 with a light spot size that is substantially the same as a size of LCOS array in LCOS light modulator 216. LCOS light modulator 216 may not allow the received optical signal to pass through all at once. Instead, LCOS light modulator 216 may spatially pass the received optical signal portion-by-portion, so that only a portion of the optical signal can be detected by photodetector 220. The size of the detected portion is much smaller than the laser spot size after collimation of condenser lens 214, therefore, the detection resolution of the receiver 206 can be further improved. Further descriptions regarding LCOS light modulator 216 will be provided in detail with reference to FIGS. 3-5. Once passing through LCOS light modulator 216, a passed-through portion of the optical signal (e.g., laser beam 215) may reach receiving lens 218. Receiving lens 218 may be configured to focus the passed-through portion of the optical signal on photodetector 220 as a focused laser beam 217.

Photodetector 220 may be configured to detect the focused laser beam 217. In some embodiments, photodetector 220 may convert the laser beam into an electrical signal 221 (e.g., a current or a voltage signal). Electrical signal 221 may be an analog signal which is generated when photons are absorbed in a photodiode included in photodetector 220. In some embodiments, photodetector 220 may include a PIN detector, an avalanche photodiode (APD) detector, a single photon avalanche diode (SPAD) detector, a silicon photo multiplier (SiPM) detector, or the like.

Readout circuit 222 may be configured to integrate, amplify, filter, and/or multiplex signal detected by photodetector 220 and transfer the integrated, amplified, filtered, and/or multiplexed signal 223 onto an output port (e.g., controller 224) for readout. In some embodiments, readout circuit 222 may act as an interface between photodetector 220 and a signal processing unit (e.g., controller 224). Depending on the configurations, readout circuit 222 may include one or more of a transimpedance amplifier (TIA), an analog-to-digital converter (ADC), a time-to-digital converter (TDC), or the like.

Controller 224 may be configured to control transmitter 204 and/or receiver 206 to perform detection/sensing operations. For instance, controller 224 may control laser emitter 208 to emit laser beams 207, or control optics 210 to shape laser beams 209. In some embodiments, controller 224 may also implement data acquisition and analysis. For instance, controller 224 may collect digitalized signal information from readout circuit 222, determine the distance of object 212 from LiDAR system 102 according to the travel time of laser beams, and construct a high-definition map or 3-D buildings and city modeling surrounding LiDAR system 102 based on the distance information of object(s) 212. In some embodiments, controller 224 may be further coupled to LCOS light modulator 216 to control state of each LCOS element (e.g., on or off), as further described in detail below.

Figure 3:
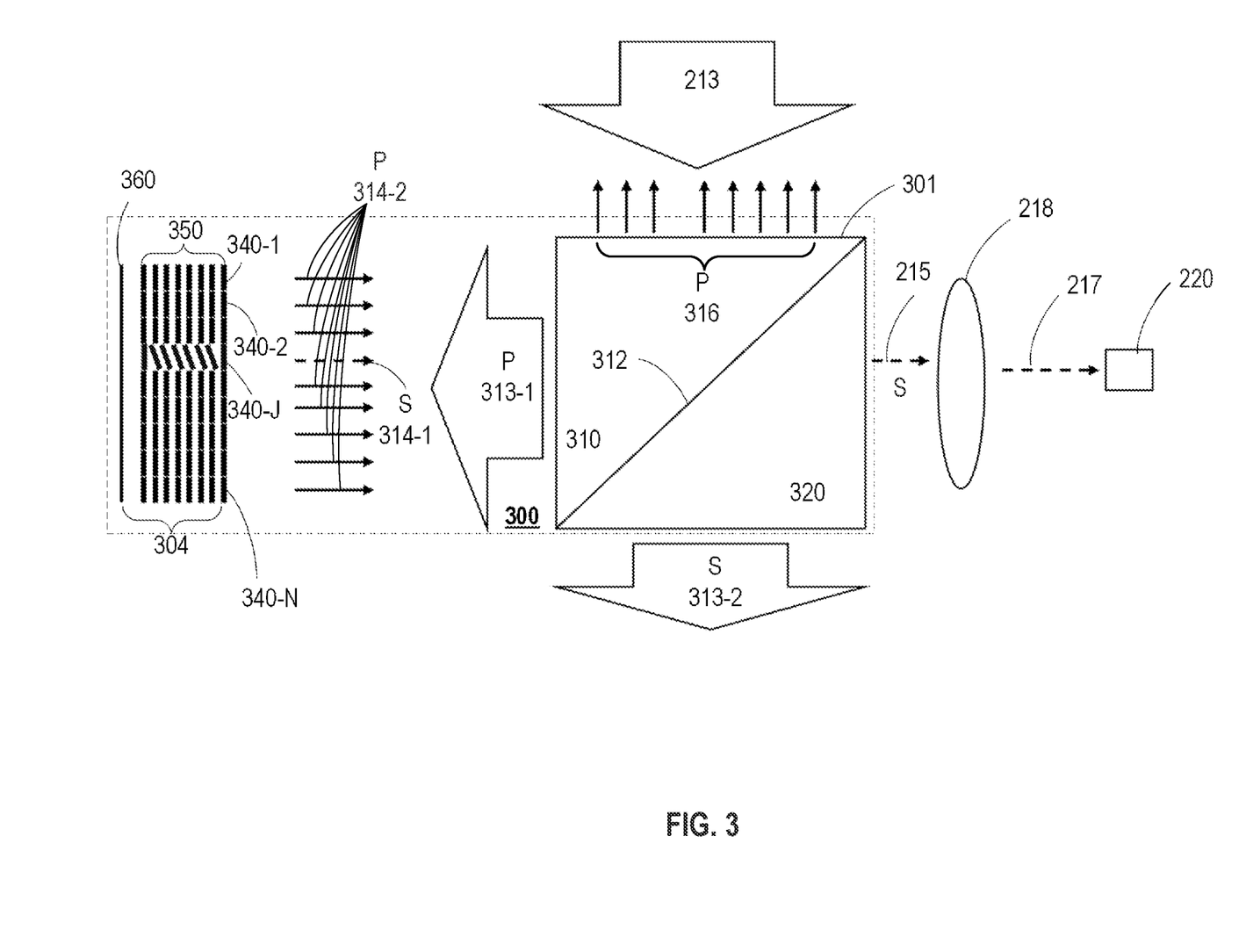
FIG. 3 illustrates a schematic diagram of an exemplary LCOS light modulator for filtering an optical signal, according to some embodiments of the disclosure.

FIG. 3 illustrates a schematic diagram of an exemplary LCOS light modulator 300 for filtering an optical signal, according to some embodiments of the disclosure. As illustrated in FIG. 3, a LCOS light modulator 300 may include a beam splitter 301 and a LCOS 304. In some embodiments, beam splitter 301 of LCOS light modulator 300 is made from two triangular calcite prisms (e.g., prisms 310 and 320). The two calcite prisms may be glued together (e.g., with cement for Glan-Thompson prisms) or spaced with an airgap (e.g., for Glan-Foucault prisms) at their bases (e.g., interface 312). As illustrated in FIG. 3, beam splitter 301 splits an incident optical signal (e.g., laser beam 213) including various polarization states into two orthogonal, linearly-polarized optical signals (e.g., p-polarized laser beam 313-1 and s-polarized laser beam 313-2). For example, p-polarized laser beam 313-1 is reflected by interface 312 towards LCOS 304 and s-polarized laser beam 313-2 is transmitted by beam splitter 301.

As illustrated in FIG. 3, beam splitter 301 directs p-polarized laser beam 213-1 to LCOS 304 including N pieces of LCOS elements 340-1, 340-2, . . . , 340-J, . . . , and 340-N (collectively or individually may be referred to as "LCOS element 340") arranged in an array. For instance, LCOS elements 340 may be arranged in a one-dimensional array, as illustrated in FIG. 3. In some embodiments, a plurality of LCOS elements may be arranged in a two-dimensional array (as an example further described in FIG. 5). In some embodiments, the LCOS elements in a same LCOS light modulator may be identical. In some embodiments, the size of the LCOS element may range from 5 um to 20 um. For ease of illustration, LCOS light modulator 300 is not shown to scale. In some alternative embodiments, the LCOS elements may be designed to have varying sizes. For example, the size of a LCOS element near the center of the LCOS array may be smaller than the size of another LCOS element near the edge as signal intensity is usually higher near the center.

In some embodiments, each LCOS element may include a twisted nematic liquid crystal (TN LC) layer (e.g., layer 350) and a reflector layer (e.g., layer 360) as illustrated in FIG. 3. Beside of the TN LC layer and the reflector layer, the LCOS element may include other layers (not shown) that will be described in detail in FIG. 5. When an electric field is applied between two sides of a TN LC layer of a LCOS element (e.g., LCOS element 340-J), the alignment of liquid crystal molecules in the TN LC layer of the LCOS element may change and the LCOS element is turned on to act as a quarter wave plate. As a result, a p-polarized optical signal received by the turned-on LCOS element is changed to a circularly-polarized optical signal. For example, as illustrated in FIG. 3, LCOS element 340-J in FIG. 3 is turned on and a corresponding portion of p-polarized laser beam 313-1 received by LCOS element 340-J is changed to a circularly-polarized laser beam.

In some embodiments, the circularly-polarized optical signal may be reflected by the reflector layer (e.g., layer 360) that is a reflective substrate coated on top of a CMOS layer (not shown in FIG. 3). The back-reflected circularly-polarized optical signal may pass through the turned-on TN LC layer (e.g., layer 350 of LCOS element 340-J) again and be changed to a linearly-polarized optical signal of a different polarization (e.g., s-polarized laser beam 314-1) towards beam splitter 301. For example, s-polarized laser beam 314-1 (illustrated in a dashed arrow) may have 90 degrees of polarization orientation change compared to p-polarized laser beam 313-1. As illustrated in FIG. 3, s-polarized laser beam 314-1 may pass through beam splitter 301 to form laser beam 215 which is received by receiving lens 218. Consistent with the present disclosure, receiving lens 218 may focus laser beam 215 on photodetector 220 as laser beam 217.

As illustrated in FIG. 3, LCOS elements (e.g., LCOS elements 340-1, 340-2, . . . 340-(J–1), 340-(J+1), . . . , 340-N) other than LCOS element 340-J are in an off state because no electric field is applied on those LCOS elements. The remaining portion of p-polarized laser beam 313-1 spatially corresponding to these turned-off LCOS element 340 may be reflected by reflector layer (e.g., layer 360) and pass through the turned-off LCOS elements in layer 350 to form a laser beam 314-2. The polarization orientation of laser beam 314-2 does not change compared to p-polarized laser beam 313-1 and thus is still p-polarized. Laser beam 314-2 may be reflected by interface 312 of beam splitter 301 to form a p-polarized laser beam 316. In some embodiments, p-polarized laser beam 316 may be disposed or collected by other detectors. It will not be collected by receiving lens 218 and photodetector 220 of the receiver.

Figure 4:
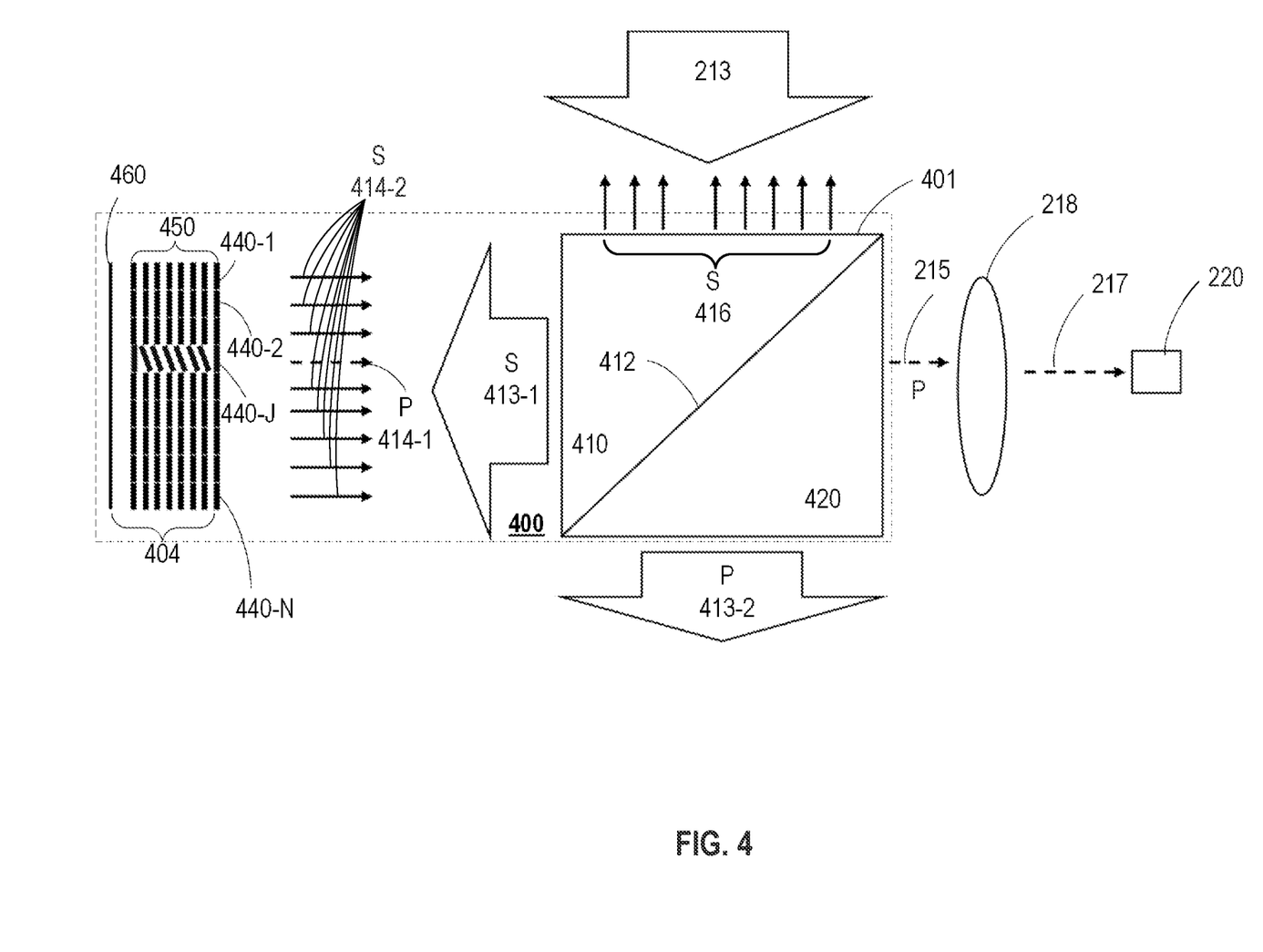
FIG. 4 illustrates a schematic diagram of another exemplary LCOS light modulator for filtering an optical signal, according to some embodiments of the disclosure.

FIG. 4 illustrates a schematic diagram of another exemplary LCOS light modulator 400 for filtering an optical signal, according to some embodiments of the disclosure. As illustrated in FIG. 4, LCOS light modulator 400 may include a beam splitter 401 and a LCOS 404. Beam splitter 401 is an alternative embodiment of the beam splitter that can be implemented in the LCOS light modulator. Similar to beam splitter 301, beam splitter 401 in LCOS light modulator 400 is made from two triangular glass prisms (e.g., prisms 410 and 420). The two glass prisms may be glued together using polyester, epoxy, or urethane-based adhesives. Unlike beam splitter 301, as illustrated in FIG. 4, beam splitter 401 may split an incident optical signal (e.g., laser beam 213) into an s-polarized laser beam 413-1 reflected by interface 412 and a p-polarized laser beam 413-2 passing through beam splitter 401. In other words, beam splitter 401 reflects/transmits optical signals of polarizations opposite to beam splitter 301. As a result, LCOS light modulator 400 spatially filters and collects optical signals of a different polarization (s-polarization) as compared to LCOS light modulator 300 (which filters and collects optical signals of p-polarization).

LCOS 404 is similar to LCOS 304. As illustrated in FIG. 4, LCOS 404 includes N pieces of LCOS elements 440-1, 440-2, . . . , 440-J, . . . , and 440-N arranged in the array. In the illustrated example, LCOS element 440-J is turned on, and other LCOS elements are turned off. A spatially-selected portion of s-polarized laser beam 413-1 is received by the spatially corresponding LCOS element 440-J and is changed to a circularly-polarized laser beam (not shown in FIG. 4). As illustrated in FIG. 4, LCOS 404 further includes a reflector layer 460 to back-reflect the circularly-polarized laser beam. The reflected circularly-polarized laser beam may pass through LCOS element 440-J and form a p-polarized laser beam 414-1 (illustrated in a dashed arrow) towards beam splitter 401. As illustrated in FIG. 4, p-polarized laser beam 414-1 is then transmitted by beam splitter 401 to form a modulated p-polarized optical signal (e.g., laser beam 215) which is received by receiving lens 218. Similar to LCOS light modulator 300 in FIG. 4, receiving lens 218 of LCOS light modulator 400 may focus laser beam 215 on photodetector 220 as laser beam 217. The remaining portion of the back-reflected optical signal, such as s-polarized laser beam 414-2 is reflected by interface 412 to a different direction as s-polarized laser beam 416 and not collected by receiving lens 218 and photodetector 220.

Figure 5:
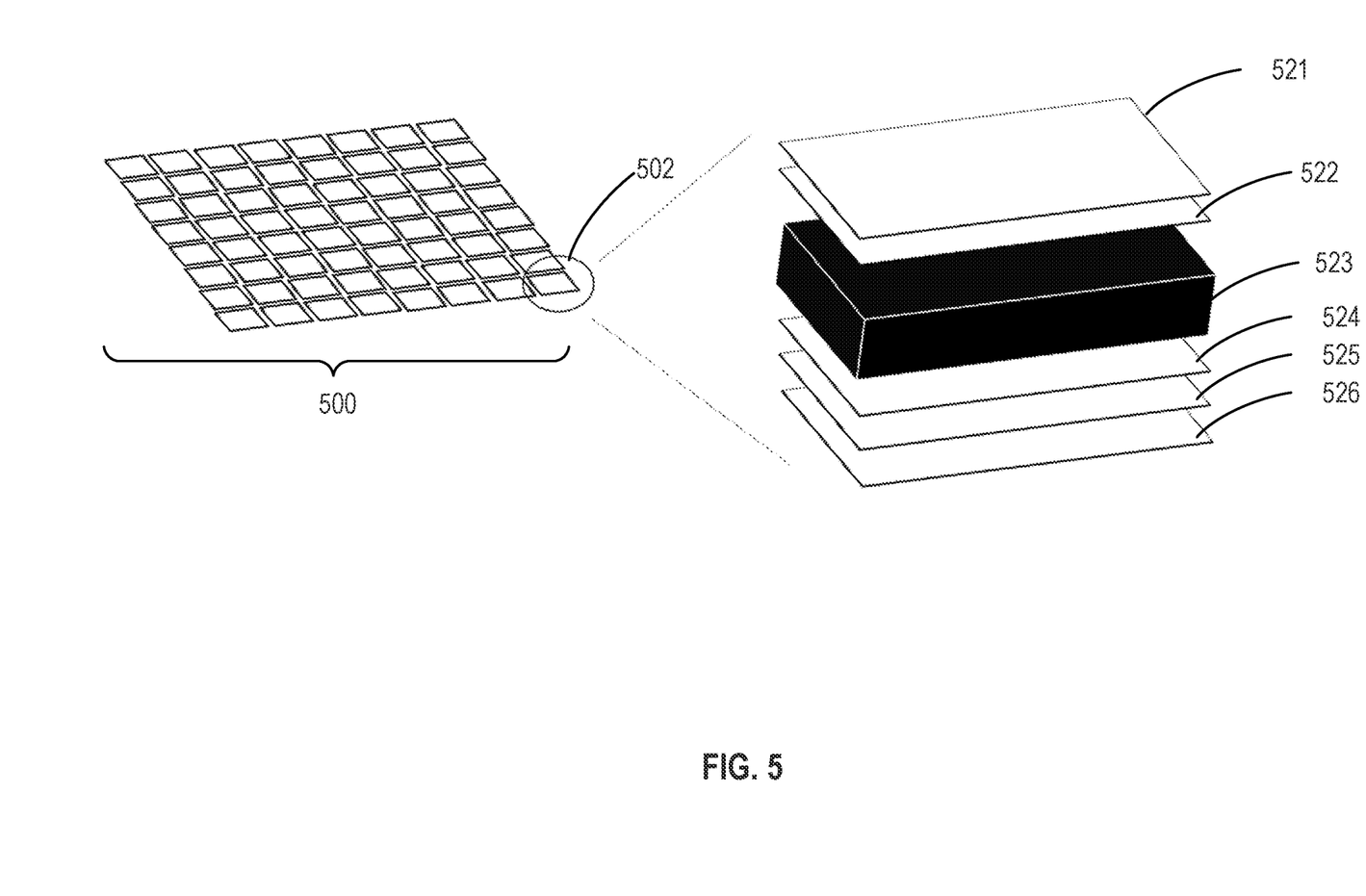
FIG. 5 illustrates an exemplary LCOS array and an exemplary structure of a LCOS element, according to embodiments of the disclosure.

FIG. 5 illustrates an exemplary LCOS array 500 and an exemplary structure of a LCOS element, according to embodiments of the disclosure. Exemplary LCOS array 500 shown in FIG. 5 is a two-dimensional array and includes a plurality of identical LCOS elements such as LCOS element 502. In some embodiments, a controller (e.g., controller 224) may be coupled to LCOS array 500 and supply a control signal to control only a small subset (e.g., one, two, etc.) of the plurality of LCOS elements to be turned on at one time. As a result, LCOS array 500 allows only a spatially-selected portion of the collimated optical signal (e.g., laser beam 213) to pass through at such time point. For example, the controller may sequentially turn on the LCOS elements of LCOS array 500 (one-by-one, two-by-two, or the like) until all the LCOS elements corresponding to the FOV signal have been turned on sequentially. Implemented in this way may allow only one or a small number of portions of the optical signal to pass through the LCOS light modulator at each time point, and thus the signal eventually detected by the photodetector may have a much smaller spot size and thus a higher resolution when compared to a sensing method that allows the whole FOV signal to pass to the photodetector all at once.

In some embodiments, each LCOS element is made of a layer-by-layered structure including a linear polarizer layer (e.g., polarizer layer 521), two transparent indium tin oxide (ITO) electrode and alignment glass layers (e.g., ITO & alignment layers 522 and 524), a TN LC layer (e.g., TN LC layer 523), a reflector layer (e.g., reflector layer 525) and a CMOS silicon backplane layer (e.g., CMOS layer 526). As illustrated in FIG. 5, TN LC layer 523 is sandwiched between ITO & alignment layers 522 and 524. Polarizer layer 521 is placed on top of ITO & alignment layer 522. Reflector layer 525 is placed under ITO & alignment layer 524. CMOS layer 526 is placed at the bottom of each LCOS element that beneath reflector layer 525. It is to be understand that some of the above-mentioned layers may be optional. The terms "on top of," "under," and "at the bottom of" are used only in relative sense to describe the embodiment illustrated in FIG. 5.

In some embodiments, the polarizer layer is configured to allow only an optical signal of the desired linear polarization orientation to enter the LCOS elements. For example, the polarizer (not shown) of LCOS element 340 in FIG. 3 may be configured to allow only p-polarized optical signal to pass through. The polarizer (not shown) of LCOS element 440 in FIG. 4 is configured to allow only s-polarized optical signal to pass through. In some embodiments, the two transparent ITO electrode and alignment glass layers are configured to align LC molecules in the TN LC layer and apply an electric field on the TN LC layer. Consistent with the present disclosure, when an electric field is applied on the two sides of TN LC layer 523, the structure of LC molecules in TN LC layer 523 may change and alter the polarization orientation of the optical signal passing through TN LC layer 523. In some embodiments, the CMOS silicon backplane layer (e.g., CMOS layer 526) is configured to receive a control signal from controller 224 and control the electric field (e.g., voltage) sequentially applied on the TN LC layer of each LCOS element for achieving spatially filtering of optical signal. For example, each LCOS element (e.g., LCOS element 502) in LCOS array 500 may spatially correspond to only a portion (i.e., a sub-resolution FOV) of the incident optical signal (e.g., laser beam 213). Therefore, when there is only one LCOS element is turned on in LCOS array 500, only optical signal of a sub-resolution FOV portion spatially corresponding to the LCOS element will be directed to the receiving lens and received by the photodetector.

Figure 6:
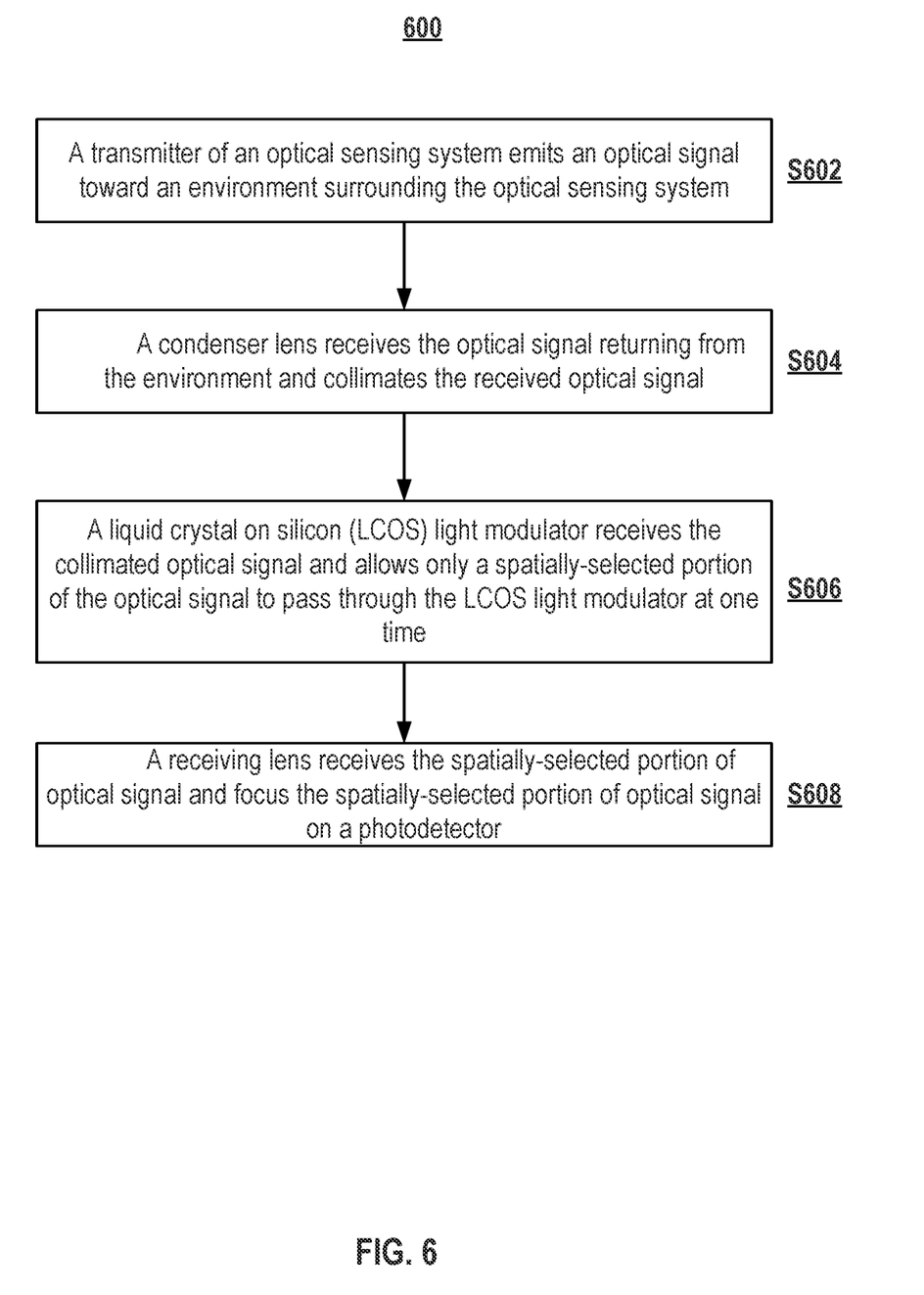
FIG. 6 is a flow chart of an exemplary optical sensing method of a LiDAR system containing a LCOS light modulator, according to embodiments of the disclosure.

FIG. 6 is a flow chart of an exemplary optical sensing method 600 performed by a LiDAR system containing a LCOS light modulator, according to embodiments of the disclosure. In some embodiments, method 600 may be performed by various components of LiDAR system 102, e.g., transmitter 204, receiver 206 containing LCOS light modulator 216, and/or controller 224. In some embodiments, method 600 may include steps S602-S608. It is to be appreciated that some of the steps may be optional. Further, some of the steps may be performed simultaneously, or in a different order than that shown in FIG. 6.

In step S602, a transmitter of an optical sensing system (e.g., transmitter 204 of LiDAR system 102) may emit an optical signal into an environment surrounding the optical sensing system. Here, the optical signal emitted by the transmitter may be first collimated (e.g., by a MEMS mirror with a certain size). The collimated optical signal may be emitted to the environment at a certain divergence. For instance, the divergence may be at a divergence of 0.44° or another divergence. This divergence value may be relatively larger than a value generally required by a high-resolution LiDAR system (e.g., a value of 0.05° or less).

In step S604, a receiver (e.g., receiver 206) of the optical sensing system may receive the optical signal returning from the environment of the optical sensing system. For instance, a condenser lens 214 may receive the returning optical signal reflected from object(s) in the environment. The returning optical signal received by the condenser lens may have a defined FOV for the LiDAR system. In some embodiments, the condenser lens may collimate the received optical signal and pass the collimated optical signal to a LCOS light modulator (e.g., LCOS light modulator 216).

In step S606, the LCOS light modulator (e.g., LCOS light modulator) may receive the collimated optical signal and allow only a spatially-selected portion of the collimated signal to pass through the LCOS light modulator at one time. As previously described, the LCOS light modulator may include a plurality of LCOS elements arranged in a one-dimensional, or two-dimensional array. A controller coupled to a CMOS silicon backplane layer of the LCOS light modulator may control only a small subset (e.g., one, two, etc.) of the plurality of LCOS elements to be turned on at one time, and thus allow only a spatially-selected portion of the collimated signal to pass through the LCOS light modulator at such time point. During a short period, the controller may sequentially turn on the LCOS elements one-by-one (or two-by-two, or the like) until all the LCOS elements corresponding to the FOV signal are turned on and off. This implementation may allow only one or a small number of portions of the FOV signal to pass through the LCOS light modulator at each time point, and thus the signal eventually detected by the photodetector may have a much smaller spot size and thus a higher resolution when compared to a sensing method that allows the whole FOV signal to pass to the photodetector all at once.

In step S608, a receiving lens (e.g., lens 218) may be configured to receive the spatially-selected portion of optical signal and focus the spatially selected portion of optical signal on a photodetector (e.g., photodetector 220). The photodetector may detect the received portion of signal and forward the detected portion of signal to other components (e.g., readout circuit 222 and controller 224) of the LiDAR system for further processing. For instance, the readout circuit may convert the received portion of signal to a digital signal and then forward the digital signal to the controller. The controller may then combine the digital signal for the received portion with other digital signals that are converted from the other portions of the FOV signal sequentially passed through the LCOS light modulator, to generate a combined signal for the whole FOV signal detected by the receiver. In this way, the receiver FOV signal may be continuously detected at a sub-resolution, to allow the achievement of a high-resolution LiDAR system.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. An optical sensing system, comprising:
a transmitter configured to emit an optical signal toward an environment surrounding the optical sensing system;
a receiver configured to receive the optical signal returning from a field of view of the environment, wherein the receiver comprises:
a liquid crystal on silicon (LCOS) light modulator configured to spatially modulate a polarization of the optical signal in order to allow only a spatially-selected portion of the optical signal to pass through the LCOS light modulator at one time; and
a receiving lens configured to focus the spatially-selected portion of the optical signal received from the LCOS light modulator on a photodetector of the receiver; and
a controller configured to:
control the LCOS light modulator to sequentially allow the spatially-selected portions of the optical signal to pass through and be sequentially detected by the photodetector as signals of a predetermined sub-resolution, wherein the spatially-selected portions of the optical signal collectively cover the entire field of view; and
combine the sub-resolution signals sequentially detected by the photodetector to generate a signal for the entire field of view of the environment.

2. The optical sensing system of claim 1, wherein the LCOS light modulator comprises a plurality of LCOS elements arranged in a one-dimensional or a two-dimensional array.

3. The optical sensing system of claim 2, wherein each LCOS element is individually addressable through an electrode, wherein the controller is configured to supply a control signal to the electrode of each LCOS element to turn on or off the LCOS element.

4. The optical sensing system of claim 3, wherein the controller is further configured to:
supply the control signal to sequentially turn on the plurality of LCOS elements according to a time-spatial pattern; and
combine the sub-resolution signals detected by the photodetector according to the time-spatial pattern.

5. The optical sensing system of claim 2, wherein at least one LCOS element spatially corresponding to the spatially-selected portion of the optical signal is turned on at one time to change the polarization of the spatially-selected portion of the optical signal.

6. The optical sensing system of claim 5, wherein the LCOS light modulator further comprises a beam splitter configured to:
split the optical signal returning from the environment into an optical signal of a first polarization and an optical signal of a second polarization; and
direct the optical signal of the first polarization towards the plurality of LCOS elements.

7. The optical sensing system of claim 6, wherein the at least one LCOS element is configured to change the spatially-selected portion of the optical signal from the first polarization to the second polarization.

8. The optical sensing system of claim 7, wherein the beam splitter is further configured to:
direct the spatially-selected portion of the optical signal of the second polarization to the receiving lens.

9. The optical sensing system of claim 7, wherein each LCOS element further comprises:
a twisted nematic liquid crystal (TN LC) layer, when turned on, configured to change a linearly-polarized optical signal of the first polarization to a circularly-polarized optical signal of the first polarization; and
a reflector configured to reflect the circularly-polarized optical signal of the first polarization,
wherein the TN LC layer, when turned on, is further configured to change the circularly-polarized optical signal of the first polarization reflected by the reflector to a linearly-polarized optical signal of the second polarization.

10. The optical sensing system of claim 1, wherein the receiver further comprises a collimation lens configured to convert the optical signal returning from the environment to a collimated beam with a light spot size substantially the same as a size of the LCOS light modulator.

11. An optical sensing method using a liquid crystal on silicon (LCOS) light modulator, comprising:
receiving an optical signal returning from a field of view of an environment;
controlling the LCOS light modulator, by a controller, to sequentially allow spatially-selected portions of the optical signal to pass through, wherein the spatially-selected portions of the optical signal collectively cover the entire field of view, wherein controlling the LCOS light modulator comprises spatially modulating a polarization of the optical signal in order to allow only the spatially-selected portion of the optical signal to pass through the LCOS light modulator at one time;
focusing, by a receiving lens, the spatially-selected portions of the optical signal received from the LCOS light modulator on a photodetector;
sequentially detecting, by the photodetector, the signals at a predetermined sub-resolution; and
combining, by the controller, the sub-resolution signals sequentially detected by the photodetector to generate a signal for the entire field of view of the environment.

12. The optical sensing method of claim 11, wherein the LCOS light modulator comprises a plurality of LCOS elements arranged in an array and each individually addressable through an electrode,
wherein spatially modulating the polarization of the optical signal further comprises turning on at least one LCOS element spatially corresponding to the spatially-selected portion of the optical signal by supplying a control signal to the electrode of the LCOS element.

13. The optical sensing method of claim 12, wherein spatially modulating the polarization of the optical signal further comprises:
sequentially turning on the plurality of LCOS elements according to a time-spatial pattern; and
combining the sub-resolution signals detected by the photodetector according to the time-spatial pattern.

14. The optical sensing method of claim 11, wherein spatially modulating the polarization of the optical signal further comprises:
splitting, by a beam splitter, the optical signal returning from the environment into an optical signal of a first polarization and an optical signal of a second polarization;

directing, by the beam splitter, the optical signal of the first polarization towards a LCOS array;

changing, by the LCOS array, the spatially-selected portion of the optical signal from the first polarization to the second polarization; and directing, by the beam splitter, the spatially-selected portion of the optical signal of the second polarization to the receiving lens.

15. The optical sensing method of claim 11, wherein spatially modulating the polarization of the optical signal further comprises:

passing optical signal of a first polarization through a first polarizer layer;

changing the spatially-selected optical signal from the first polarization to a second polarization; and passing the spatially-selected optical signal of the second polarization through a second polarizer layer.

16. The optical sensing method of claim 11, further comprising:

converting, by a collimation lens, the optical signal returning from the environment to a collimated beam with a light spot size substantially the same as a size of the LCOS light modulator.

17. A receiver for receiving an optical signal returning from a field of view of an environment, comprising:

a liquid crystal on silicon (LCOS) light modulator configured to spatially modulate a polarization of the optical signal in order to allow only a spatially-selected portion of the optical signal to pass through the LCOS light modulator at one time; and a receiving lens configured to focus the spatially-selected portion of the optical signal received from the LCOS light modulator on a photodetector of the receiver; and a controller configured to:

control the LCOS light modulator to sequentially allow the spatially-selected portions of the optical signal to pass through and be sequentially detected by the photodetector as signals of a predetermined sub-resolution, wherein the spatially-selected portions of the optical signal collectively cover the entire field of view; and combine the sub-resolution signals sequentially detected by the photodetector to generate a signal for the entire field of view of the environment.

18. The receiver of claim 17, wherein the LCOS light modulator comprises a plurality of LCOS elements and each LCOS element is individually addressable through an electrode, wherein the controller is configured to supply a control signal to the electrode of each LCOS element to turn on or off the LCOS element.

19. The receiver of claim 18, wherein the controller is further configured to:

supply the control signal to sequentially turn on the plurality of LCOS elements according to a time-spatial pattern; and combine the sub-resolution signals detected by the photodetector according to the time-spatial pattern.

20. The receiver of claim 17, further comprising a collimation lens configured to convert the optical signal returning from the environment to a collimated beam with a light spot size substantially the same as a size of the LCOS light modulator.

* * * * *